United States Patent [19]

Honda et al.

[11] Patent Number: 4,562,586
[45] Date of Patent: Dec. 31, 1985

[54] X-RAY IMAGE PICK-UP DEVICE

[75] Inventors: Michitaka Honda; Osamu Takami, both of Tochigi, Japan

[73] Assignee: Kabushiki Kaisha Toshiba, Japan

[21] Appl. No.: 610,666

[22] Filed: May 16, 1984

[30] Foreign Application Priority Data

May 18, 1983 [JP] Japan ................................. 58-88282

[51] Int. Cl.[4] ............................................. H05G 1/44
[52] U.S. Cl. ....................................... 378/108; 378/99
[58] Field of Search .................. 378/99, 108, 109, 110, 378/111, 112; 358/111

[56] References Cited

U.S. PATENT DOCUMENTS 4,423,521 12/1983 Haendle .............................. 378/108
4,473,843 9/1984 Bishop .................................... 378/99
4,479,231 10/1984 Haendle ................................ 378/99

Primary Examiner—Craig E. Church
Attorney, Agent, or Firm—Finnegan, Henderson, Farabow, Garrett & Dunner

[57] ABSTRACT

An X-ray image pick-up device includes an X-ray source for radiating X-rays onto an object including a region of interest, an image intensifier for converting to an optical image an X-ray image obtained when the X-rays radiated from the X-ray source are transmitted through the object, an image pick-up camera for converting to an image pick-up signal the optical image which is generated from the image intensifier, and an optical diaphragm arranged between the image intensifier and the image pick-up camera for adjusting an amount of optical image light incident on the image pick-up camera. The X-ray image pick-up device further includes an exposure controller for detecting both the maximum value of image pick-up signals from the pick-up camera and the average value of the image pick-up signals in the region of interest at a time of fluoroscopic examination, for calculating the density resolutions of the output pick-up signals from the image pick-up camera with respect to the various combinations of tube voltages, tube currents and optical diaphragm values, and for determining a tube voltage and a tube current of an X-ray source, along with an optical diaphragm value so as to provide a maximum density resolution which permits the device to always operate under optimal exposure conditions.

5 Claims, 6 Drawing Figures

F I G. 1
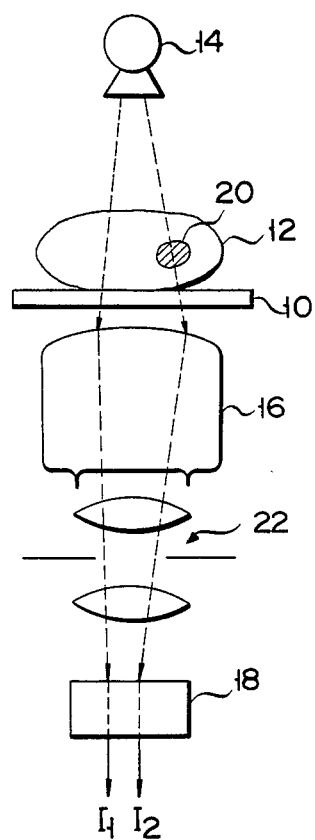
F I G. 2
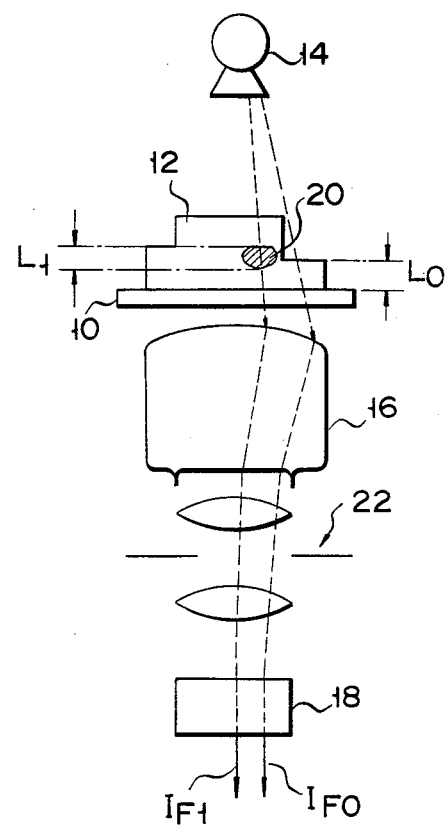

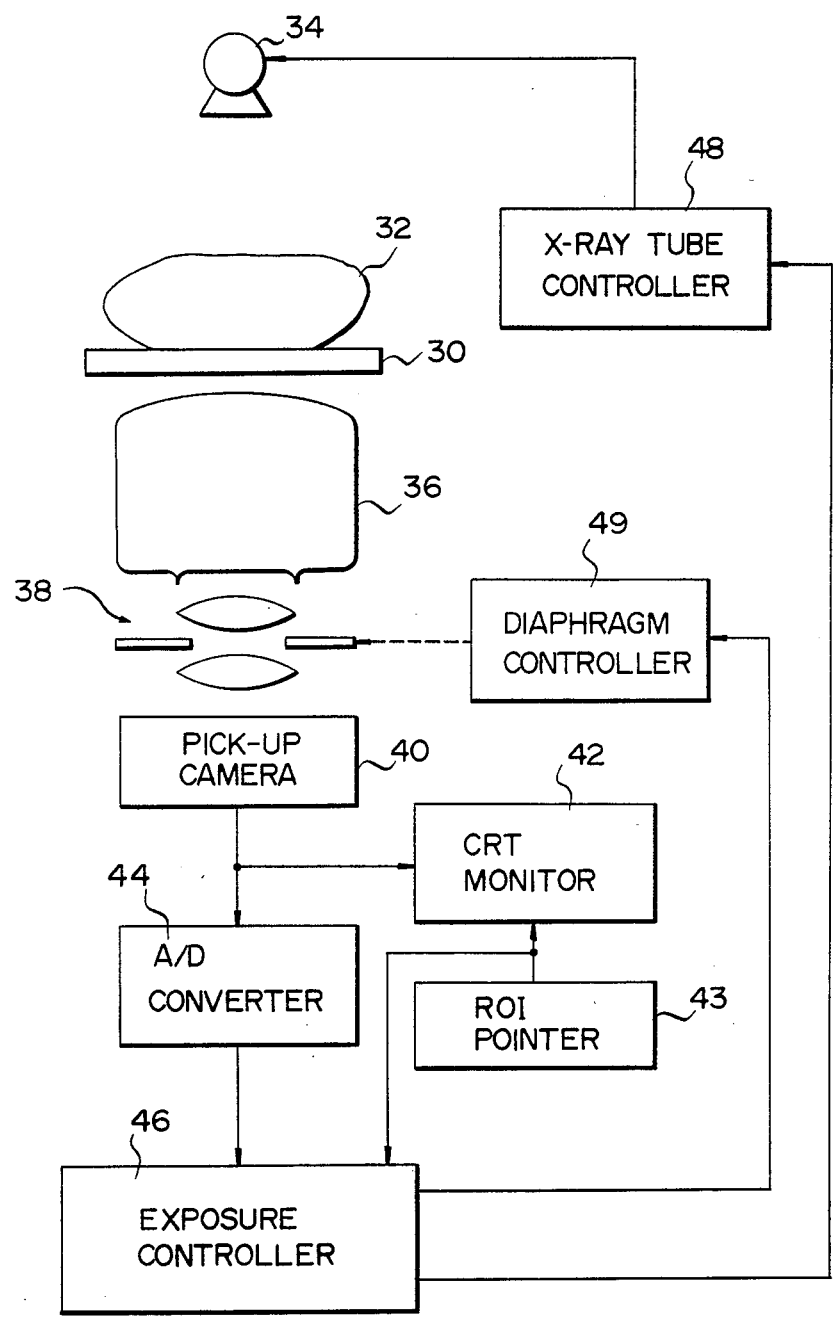

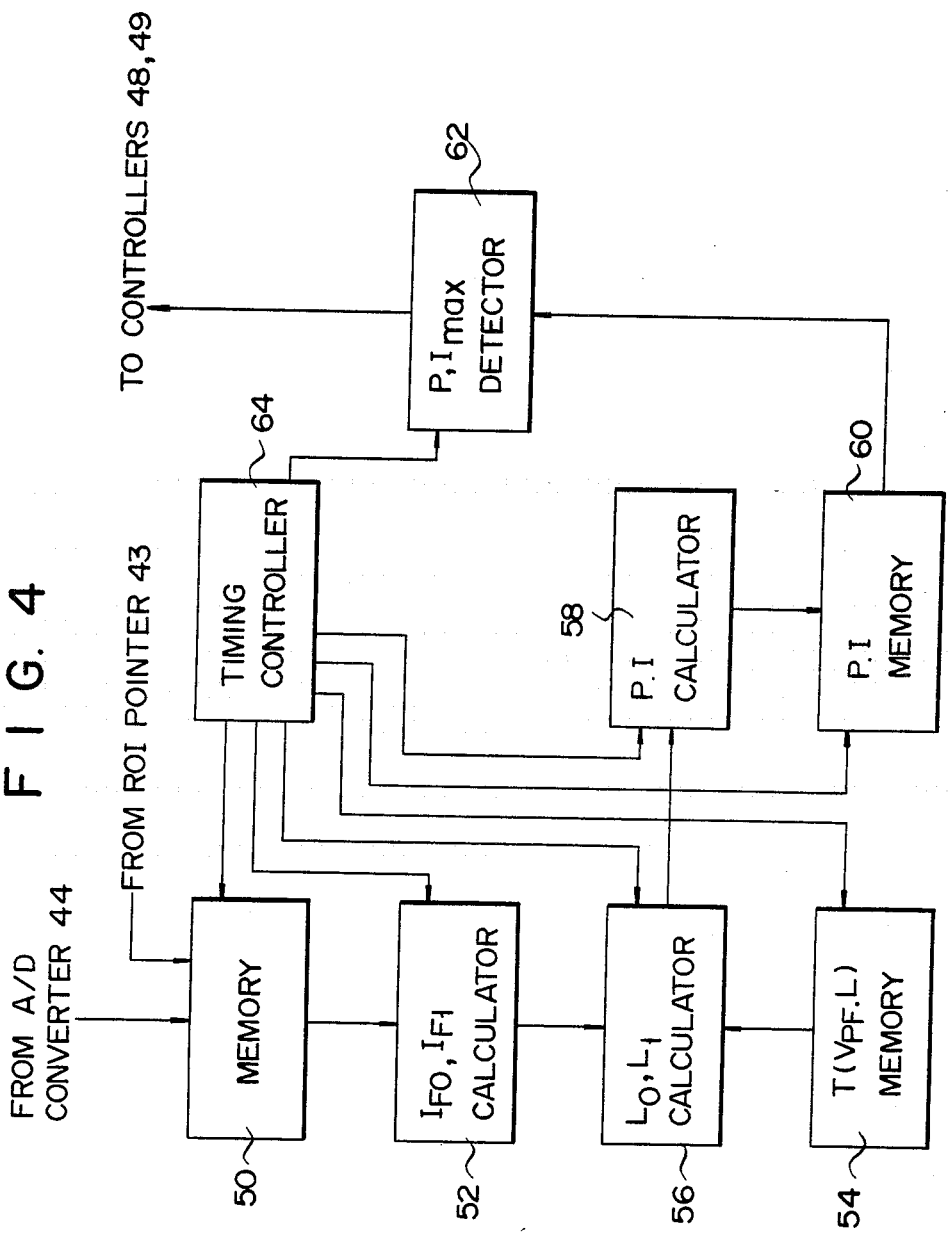

X-RAY IMAGE PICK-UP DEVICE

BACKGROUND OF THE INVENTION

The present invention relates to an X-ray image pick-up device such as an X-ray television system.

Television camera exposure is determined by an X-ray pick-up tube voltage, its current and an optical diaphragm or stop for variably controlling an amount of light incident on the television camera. Conventionally, exposure is controlled by an X-ray physician who adjusts the tube voltage and tube current so as to keep a maximum value of an output pick-up signal level from the television camera below the certain saturation level in accordance with practical experience and such that the optical diaphragm is adjusted in accordance with the amount of light incident on the television camera. There are various combinations of values of these three factors for setting an output pick-up signal level of the television camera to be a predetermined level. However, there is only one combination of the three factors that achieves the optimal (maximum) density resolution (corresponding to the difference in density between the region of interest in the picture and the region of noninterest). For this reason, it is difficult to determine if the preset combination provides the optimal density resolution. In addition, although a sensor is arranged behind the optical diaphragm (i.e., between the diaphragm and the camera) in the optical system to measure the amount of light incident on the television camera through the optical diaphragm, the sensor measures only the amount of light passing through the central portion of the optical diaphragm. Halation occurs in the peripheral portion of the resultant image. In addition to this disadvantage, a sensor shadow or ghost tends to appear in the image.

SUMMARY OF THE INVENTION

It is an object of the present invention to provide an X-ray image pick-up device capable of setting the pick-up camera exposure so as to achieve an optimal density resolution in accordance with an output signal of the pick-up camera.

In order to achieve the above object of the present invention, there is provided an X-ray image pick-up device comprising an X-ray source for radiating X-rays onto an object including the region of interest, an image intensifier for converting to an optical image an X-ray image obtained when the X-rays radiated from the X-ray source are transmitted through the object, an image pick-up camera for converting to an image pick-up signal the optical image which is generated from the image intensifier, an optical diaphragm arranged between the image intensifier and the image pick-up camera for adjusting the amount of incident light on the image pick-up camera, and an exposure controller for detecting the maximum value of the image pick-up signals from the pick-up camera and the average value of the image pick-up signals in the region of interest at the time of fluoroscopic examination, calculating the density resolutions of the output pick-up signals of the image pick-up camera with respect to the various combinations of tube currents, tube voltages and optical diaphragm values, and determining the tube voltage, tube current, and the optical diaphragm value so as to provide a maximum density resolution.

According to the X-ray image pick-up device of the present invention, the optimal cambination of a tube voltage, a tube current and an optical diaphragm to obtain the maximum density resolution is determined using only the image pick-up signal during a fluoroscopic examination, that is the measurement of the amount of light incident on the image pick-up camera is omitted.

BRIEF DESCRIPTION OF THE DRAWINGS

FIG. 1 is a schematic representation of an X-ray image pick-up device which explains the principle of the present invention;

FIG. 2 is a schematic representation showing an water equivalent phantom which explains the principle of the present invention;

FIG. 3 is a block diagram of an X-ray image pick-up device according to an embodiment of the present invention;

FIG. 4 is a detailed block diagram of the exposure controller shown in FIG. 3.

DETAILED DESCRIPTION OF THE PREFERRED EMBODIMENTS

Figure 5A:
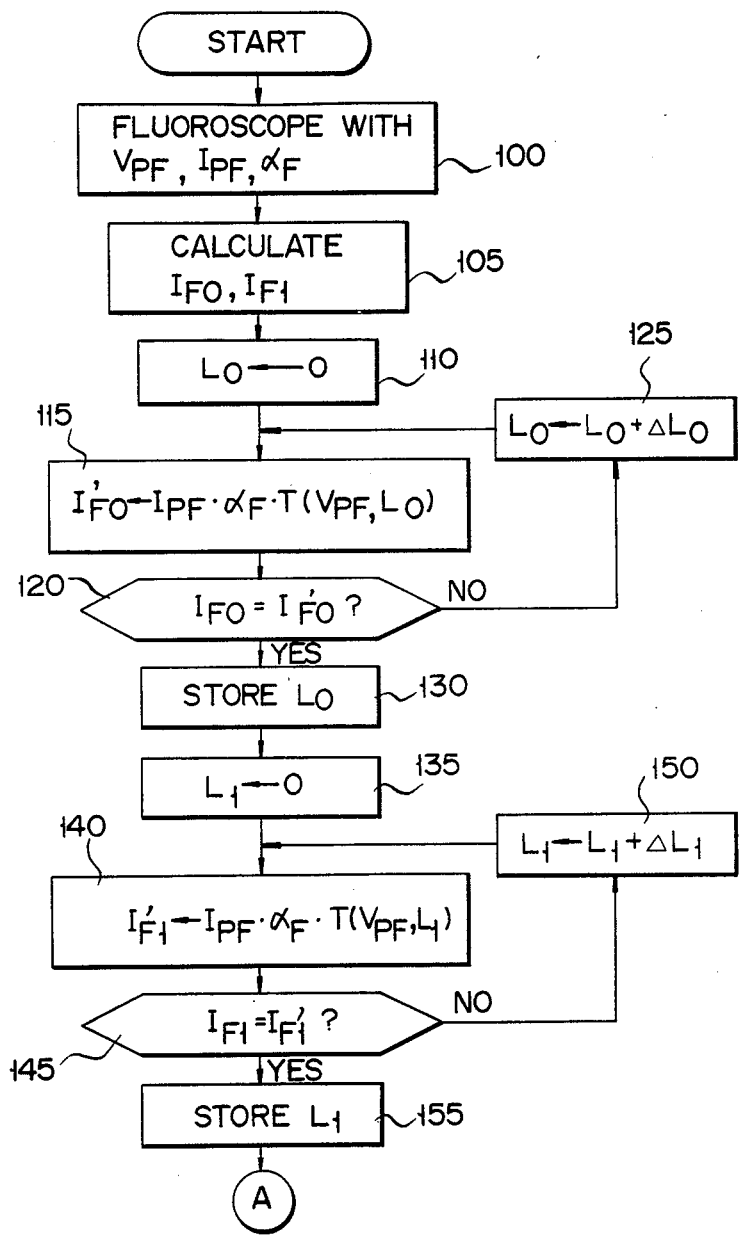
FIGS. 5A and 5B are flow charts for explaining the operation of the X-ray image pick-up device shown in FIG. 3.

An X-ray image pick-up device according to an embodiment of the present invention will now be described with reference to the accompanying drawings.

The density resolution subjected to be controlled will be described. The schematic configuration of the X-ray image pick-up device is illustrated in FIG. 1. X-rays from an X-ray tube 14 irradiate an object 12 placed on a bed 10. An X-ray image obtained by transmitting the X-rays through the object 12 is converted to an optical image by an image intensifier tube 16. The optical image is then converted to an image pick-up signal by an image pick-up camera 18. The hatched region 20 of the object 12 represents the region of interest. For example, the region of interest in angiography is a blood vessel. An optical system 22 having an optical diaphragm is arranged between the image intensifier tube 16 and the pick-up camera 18. The density resolution in the X-ray image pick-up device is defined by the following factors. The factors comprise image pick-up signals $I_1$ and $I_2$, and noise components $N_1$ and $N_2$ (effective values). The signals $I_1$ and $I_2$ are obtained such that an X-ray (number of photons $\phi_1$) illuminated onto the object 12 from the X-ray tube 14, transmitted through a portion of the obejct 12 which excludes the region 20 of interest and an X-ray (number of photons $\phi_2$) similarly illuminated onto the object 12 from the X-ray tube 14, transmitted through the region 20 of interest thereof are respectively converted by the image intensifier tube 16 and the pick-up camera 18. The noise components $N_1$ and $N_2$ are superposed on the image pick-up signals $I_1$ and $I_2$, respectively. As previously described, the density resolution is the density difference between the region of interest and the region of noninterest of the image. A level difference between the image pick-up signals $I_1$ and $I_2$ must not be decreased by noise and must be detected meaningfully so as to distinguish the region of interest from the region of noninterest in the image. For this purpose, the S/N ratio of the image pick-up signal must be high. The following performance index (PI) is derived in accordance with the S/N ratio of the image pick-up signal and is defined as the density resolution. The larger the PI becomes, the easier the discrimination of the region of interest becomes.

$$PI = (I_2 - I_1)^2 / (N_1^2 + N_2^2) \quad (1)$$

The image pick-up signals $I_1$ and $I_2$ included in the PI are given as follows:

$$I_1 = \phi_1 \cdot \bar{E} \cdot \alpha \quad (2)$$

$$I_2 = \phi_2 \cdot \bar{E} \cdot \alpha \quad (3)$$

where E is the mean energy (KeV) per photon transmitted through the object 12, and $\alpha$ is a system total gain ($\alpha$ is controlled by an aperture size) of the image intensifier 16, the pick-up camera 18 and the optical system 22. The mean energy E is obtained by simulation in advance and is defined as a constant. The gain $\alpha$ is a factor which can be externally controlled to control the performance index PI.

Each of the noise components $N_1$ and $N_2$ (mA) mainly includes noise $\sqrt{\phi_1} \cdot \bar{E} \cdot \alpha$ caused by photon vibrations, shot noise $\sqrt{I_1} \cdot C_1$ generated during the generation of beams from the pick-up camera 18, and thermal hoise $C_2$ generated during amplification of a signal current flowing through the pick-up camera 18. Any other noise can be neglected, therefore:

$$N_1^2 \approx N_2^2 = \phi_1 \cdot \bar{E}^2 \cdot \alpha^2 + I_1 \cdot C_1^2 + C_2^2 \quad (4)$$

Substitution of equation (4) into equation (1) yields:

$$PI = \alpha^2 \cdot \bar{E}^2 \cdot (\phi_2 - \phi_1)^2 / \{\alpha^2 \cdot \bar{E}^2 \cdot \phi_1 + \alpha \cdot \bar{E} \cdot \phi_1 \cdot C_1^2 + C_2^2\} \quad (5)$$

It is apparent from equation (5) that the externally controllable factors for controlling the density integration PI are the number of photons $\phi_1$ and $\phi_2$, and the gain $\alpha$.

The number of photons of the X-rays are given as a function of the tube voltage and tube current of the X-ray tube 14, and the gain is the diaphragm value.

These three factors cannot be freely selected but must satisfy the condition that the ratings of the X-ray tube 14 (the product of the tube voltage and the tube current be less than a predetermined value), and the condition that the output image pick-up signal from the image pick-up camera 18 does not exceed the saturation level.

The two above-described conditions will now be further explained. The first condition can be considered when the tube voltage and tube current of the X-ray tube 14 are determined. However, the second condition depends considerably upon the thickness of the object 12. The thickness of the object 12 must be thus considered. As shown in FIG. 1, the thickness of the object 12 is normally nonuniform. The output image pick-up signal from the image pick-up camera 18 becomes maximum when the X-ray passes through the portion of the object 12 having the smallest thickness. An image pick-up signal $I_0$ obtained such that the X-ray passes through the portion of the object 12 having the smallest thickness is derived in the same manner as in equations (2) and (3):

$$I_0 = \phi_0 \cdot \bar{E} \cdot \alpha \quad (6)$$

When the saturation level is given to be $I_{max}$, the second condition is expressed as follows:

$$I_0 \leq I_{max} \quad (7)$$

Establishment of equality (7) maximizes the density resolution, as is apparent from equations (5) and (6). In other words, the gain must satisfy the following equation to satisfy the second condition:

$$\alpha = I_{max} / (\bar{E} \cdot \phi_0) \quad (8)$$

In this manner, the gain $\alpha$ can be derived independently of the performance index PI, so that the gain $\alpha$ is obtained before the performance index PI is obtained. More particularly, substitution of equation (8) into equation (5) yields:

$$PI = I_{max}^2 (\phi_2 - \phi_1)^2 / (I_{max} \phi_0 \phi_1 C_1^2 + C_2^2 \phi_0^2 + I_{max}^2 \phi_1) \quad (9)$$

The performance index PI can thus be controlled by only the numbers of photons $\phi_0$, $\phi_1$ and $\phi_2$ in accordance with equation (9).

When a tube voltage is set at a predetermined value, a maximum current (saturation level) which satisfies inequality (7) can be determined in accordance with the ratings of the X-ray tube 14. The performance index PI is calculated in accordance with equation (9) using the obtained maximum tube current, thereby obtaining a maximum density performance index PI at a preset diaphragm value. In practice, density resolution performance indices PI at various tube voltages are obtained. A combination of a tube current, a tube voltage and an optical diaphragm value which gives the maximum PI provides an optimal exposure. In this case, the optical diaphragm value is calculated from equation (8).

The numbers of photons $\phi_0$, $\phi_1$ and $\phi_2$ in equation (9) will now be explained. These parameters are given as follows:

$$\phi_0 = \Phi(V_P) \cdot I_P \cdot e^{-\bar{\mu}(V_P, L_0) \cdot L_0} \quad (10)$$

$$\phi_1 = \Phi(V_P) \cdot I_P e^{-\bar{\mu}(V_P, L_1) \cdot L_1} \quad (11)$$

$$\phi_2 = \Phi(V_P) \cdot I_P e^{-\bar{\mu}(V_P, L_1) \cdot L_1} \cdot e^{-\Delta\bar{\mu}(V_P, L_2) \cdot L_2} \quad (12)$$

where $V_P$ and $I_P$ are the tube voltage and tube current of the X-ray tube 14, respectively, $\Phi(V_P)$ is the number of output photons from the X-ray tube 14 per unit time when the tube current is set at $V_P$ (KeV) and the tube current is set at 1 mA. $L_0$ and $L_1$ are respectively the minimum thickness of the object 12 and the mean thicknesses of the region 20 of interest of the object 12 when the object 12 is represented by the water equivalent phantom, as shown in FIG. 2. The thickness of the object 12 which is represented by the water equivalent phantom is called the water equivalent thickness hereinafter. $L_2$ is the actual thickness of the region 12 of interest. The actual thickness $L_2$ is given to be a specific value for each region 12 of interest. $\bar{\mu}(V_P, L_0)$ and $\mu(V_P, L_1)$ are respectively mean (X-ray) absorption coefficients of the water equivalent phantoms having the water equivalent thicknesses of $L_0$ and $L_1$ when the tube voltage is $V_P$(KeV) and the tube current is 1 mA. These absorption coefficients can be obtained by prior simulation and are respectively regarded as constants. $\Delta\bar{\mu}(V_P, L_2)$ is the difference (absolute value) between the mean (X-ray) absorption coefficient of the actual region of interest having the thickness $L_2$ at the tube voltage $V_P$(KeV) and the tube current of 1 mA and the mean (X-ray) absorption coefficient of the phantom whose equivalent water thickness is given to be $L_2$. In other words, in order to solve equations (10), (11) and (12), the water equivalent thicknesses $L_0$ and $L_1$ must be obtained. The water equivalent thicknesses $L_0$ and $L_1$ have the following relationship with the output image pick-up signal from the image pick-up camera 18, so that these thicknesses can be derived from the output image pick-up signal from the image pick-up camera 18. Alternatively, the water equivalent thicknesses $L_0$ and $L_1$ can be derived from the signal obtained when the fluoroscopic examination for positioning the object 12 is carried out before the actual photographing.

$$I_{F0} = I_{PF} \alpha_F T(V_{PF}, L_0) \qquad (13)$$

$$I_{F1} = I_{PF} \alpha_F T(V_{PF}, L_1) \qquad (14)$$

where $I_{F0}$ and $I_{F1}$ are respectively the maximum value (signal value obtained when the X-ray passes through the portion of the object 12 having the smallest thickness) and the mean value of the image pick-up signal obtained when the X-ray passes through the region 20 of interest. $I_{PF}$, $V_{PF}$ and $\alpha_F$ are respectively the tube current (mA), the tube voltage (KeV) and the optical diaphragm for determining the gain. $T(V_{PF}, L)$ is a function when the tube voltage $V_{PF}$ is used as a parameter and the equivalent water thickness $L$ is used as a variable, where $T(V_{PF}, L)$ is given by:

$$T(V_{PF}, L) = \Phi(V_{PF}) \cdot e^{-\overline{\mu}(V_{PF}, L) \cdot L} \cdot \overline{E}(V_{PF}, L) \qquad (15)$$

The functions $T(V_{PF}, L)$ are obtained by a simulation using various voltages $V_{PF}$ and various thicknesses $L$. Then, the equivalent water thicknesses $L_0$ and $L_1$ can be derived from equations (13) and (14).

It is readily understood from the principle described above that the exposure (tube current, tube voltage, optical diaphragm) for the maximum density resolution can be obtained from the data obtained at a fluoroscopic examination before the actual photographing.

An X-ray image pick-up device based on the principle described above will now be described according to an embodiment of the present invention. FIG. 3 is a block diagram showing the overall configuration of the X-ray image pick-up device. An X-ray tube 34 is arranged above an object 32 placed on a bed 30. An X-ray from the X-ray tube 34 irradiates the object 32. An image intensifier tube 36 is arranged below the bed 30 to convert to an optical image an X-ray image which represents an X-ray absorption coefficient distribution of the object 32. The amount of light of the optical image generated from the image intensifier 36 is adjusted by a tandem lens type optical system 38 having an optical diaphragm. The adjusted optical image then becomes incident on an image pick-up surface of an image pick-up camera 40. An output image pick-up signal from the pick-up camera 40 is supplied to a CRT monitor 42 where it is displayed. The output signal from the pick-up camera 40 is also supplied to an A/D converter 44. The CRT monitor 42 has an ROI (region of interest) pointer 43 such as a light pen which specifies the region of interest of the object image on the screen. An output signal from the A/D converter 44 is supplied to an exposure controller 46 for determining the exposure (i.e., tube current, tube voltage and optical diaphragm value) to maximize the density resolution, which is the principal feature of the present invention. Outputs from the exposure controller 46 are supplied to an X-ray tube controller 48 for controlling the tube current and tube voltage of the X-ray tube 34, and to a diaphragm controller 49 for controlling the diaphragm of the optical system 38.

A detailed block diagram of the exposure controller 46 is illustrated in FIG. 4. The digital image pick-up signal supplied to the exposure controller 46 is temporarily stored in a memory 50. The memory 50 also receives an output signal from the ROI pointer 43. An output signal from the memory 50 is supplied to an $I_{F0}, I_{F1}$ calculator 52 which calculates a maximum value $I_{F0}$ of the image pick-up signal (the signal level of an X-ray transmitted through the smallest thickness of the object 32) and an average value $I_{F1}$ of the image pick-up signal obtained when the X-ray passes through the region of interest. A $T(V_{PF}, L)$ memory 54 prestores the values $T(V_{PF}, L)$ of various water equivalent thicknesses and tube voltages. The values $I_{F0}$ and $I_{F1}$ calculated by the $I_{F0}, I_{F1}$ calculator 52 are supplied to an $L_0, L_1$ calculator 56. The $L_0, L_1$ calculator 56 also receives the tube voltage, the tube current and the optical diaphragm value at the time of a fluoroscopic examination. The $L_0, L_1$ calculator 56 calculates the minimum water equivalent thickness $L_0$ of the object 32, and a mean water equivalent thickness $L_1$ of the region of interest by using the input data in accordance with equations (13) and (14). When the thicknesses $L_0$ and $L_1$ are calculated, the performance index PI can be calculated in accordance with equation (9). A PI calculator 58 calculates performance indices PI for various combinations of tube voltages, tube currents and optical diaphragm values. The calculation results are stored in a PI memory 60. A $PI_{max}$ detector 62 detects a maximum performance index $PI_{max}$ and reads out the corresponding combination of tube current, tube voltage and optical diaphragm value from the PI memory 60. This readout data is supplied to the X-ray tube controller 48 and the diaphragm controller 49. A timing controller 64 controls the various operation timings of the exposure controller 46. The X-ray tube controller 48 controls the voltage and current of the X-ray tube 34 in accordance with the output from the $PI_{max}$ detector 62. The diaphragm controller 49 controls the optical diaphragm in the optical system 38 in accordance with the output from the $PI_{max}$ detector 62.

Figure 5B:
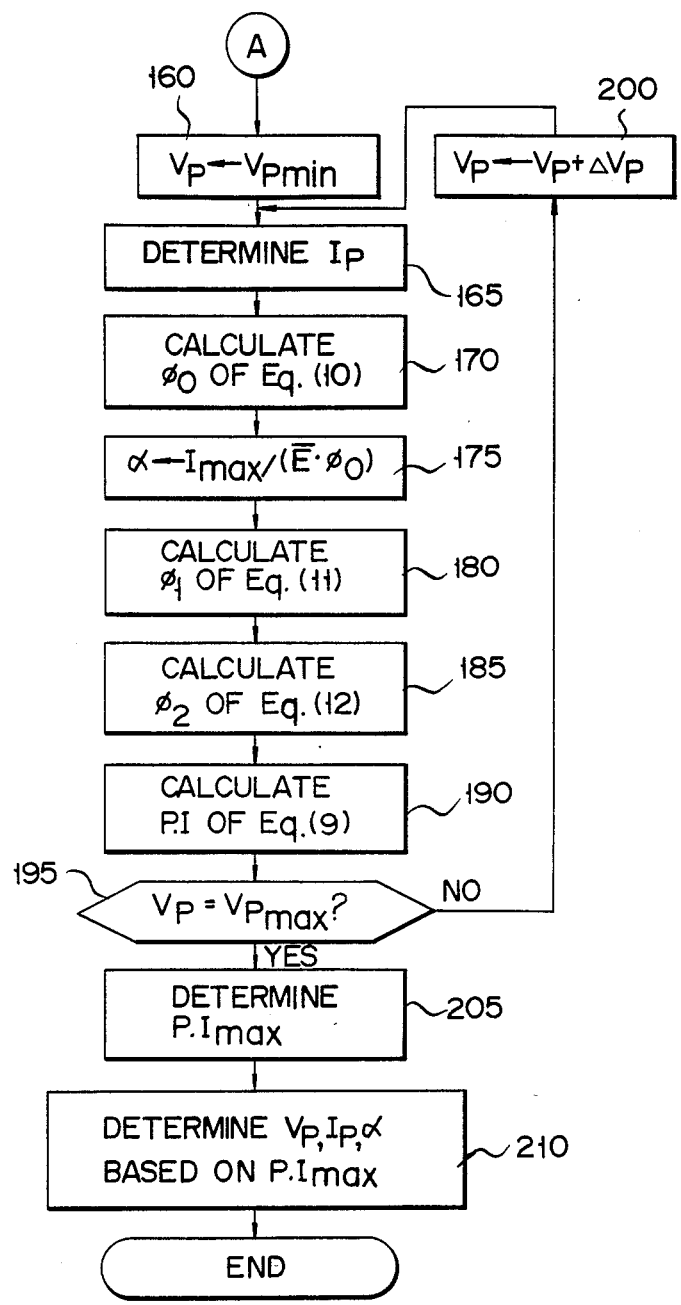

The operation of the X-ray image pick-up device described above will be described with reference to the flow charts shown in FIGS. 5A and 5B. During a fluoroscopic examination, the object 32 must be properly positioned and the exposure which maximizes the density resolution must be determined. In step 100, the X-ray tube controller 48 and the diaphragm controller 49 are manually operated to preset the tube voltage and tube current of the X-ray tube 34 along with the optical diaphragm value of the optical system 38, and thus, a proper fluoroscopic examination is performed. An X-ray image obtained by transmitting the X-ray through the object 32 is converted to an image pick-up signal by the image intensifier tube 36 and the pick-up camera 40. The image pick-up signal is converted by the A/D converter 44 to a digital signal which is then stored in the memory 50. At this time, the X-ray physician properly positions the object 32 and specifies the region of interest of the image on the CRT monitor 42 with the ROI pointer 43. In step 105, the $I_{F0}, I_{F1}$ calculator 52 receives data read out from the memory 50, and calculates the maximum value $I_{F0}$ and the mean value $I_{F1}$ of the region of interest data. In this embodiment, the values L0 and L1 are altered to obtain various results in accordance with equations (13) and (14). These various results are compared with the values $I_{F0}$ and $I_{F1}$ calculated by the $I_{F0},I_{F1}$ calculator 52. The resultant values which coincide with the values $I_{F0}$ and $I_{F1}$ are detected as the desired values of $L_0$ and $L_1$. For this purpose, let $L_0$ be 0 in step 110, and equation (13) is calculated in step 115. It is checked in step 120 whether or not the calculation result $I_{F0}$ coincides with the value $I_{F0}$ calculated by the $I_{F0},I_{F1}$ calculator 52. If NO in step 120, the value $L_0$ is incremented by $\Delta L_0$ in step 125, and step 115 is repeated. When a coincidence is established in step 120 (e.g., if YES in step 120), the value $L_0$ is stored as the minimum water equivalent thickness of the object 32 in step 130. The same operation is performed for the value $L_1$ in steps 135, 140, 145, 150 and 155.

When values $L_0$ and $L_1$ are determined, the density resolution will be calculated in accordance with equation (9). First, the tube voltage $V_P$ at the time of photographing is set at a minimum value $V_{Pmin}$ in step 160. The tube current $I_P$ is automatically preset in step 165 in accordance with the ratings of the X-ray tube 34. In step 170, the value $\phi_0$ of equation (10) is calculated. The saturation level $I_{max}$ which determines the upper limit level of the output signal generated from the pick-up camera 40 is given to be a constant inherent to the pick-up camera 40. When the value $\phi_0$ is obtained, the gain (optical diaphragm) $\alpha$ of equation (8) is calculated in step 175. The values $\phi_1$ and $\phi_2$ of equations (11) and (12) are calculated in steps 180 and 185, respectively. Thus, all the data required to calculate the performance index PI is obtained. The density resolution performance index PI of equation (9) is calculated in step 190. In order to obtain the maximum density resolution performance index $PI_{max}$, various PIs must be calculated at various tube voltages. For this reason, it is checked in step 195 to see if whether or not the tube voltage has been set at the maximum value $V_{Pmax}$. If NO in step 195, the tube voltage $V_P$ is incremented by $\Delta V_P$ in step 200, and step 165 is repeated. In this manner, the PIs for all the tube voltages are obtained and are stored in the PI memory 60. In step 205, the maximum performance index $PI_{max}$ is read out from the PI memory 60. The corresponding tube voltage, tube current and optical diaphragm value at the time of photographing are preset in step 210.

According to the present invention as described above, the performance index PI representing the density resolution is quantitatively represented by the tube voltage, the tube current and the optical diaphragm value. Therefore, a single combination of the tube voltage, tube current and the optical diaphragm value is determined by the image pick-up signal obtained during a fluoroscopic examination, thereby obtaining the maximum density resolution.

However, the present invention is not limited to the particular embodiment described above. Various changes and modifications may be made within the spirit and scope of the invention.

What is claimed is:

1. An X-ray image pick-up device comprising:
    an X-ray source for radiating X-rays onto an object including a region of interest;
    means for converting to an optical image an X-ray image obtained when the X-rays irradiate the object and are transmitted therethrough;
    image pick-up means for converting to an image pick-up signal the optical image which is generated from said converting means;
    optical diaphragm means, disposed between said converting means and said image pick-up means, for adjusting an amount of light incident on said image pick-up means; and
    exposure control means for detecting a maximum value of image pick-up signals from said image pick-up means and an average value of the image pick-up signals in the region of interest when a single image pick-up operation is performed, calculating density resolutions of output pick-up signals of said image pick-up means with respect to various combinations of tube voltages and tube currents of said X-ray source and optical diaphragm values of said optical diaphragm means, and determining the tube voltage and the tube current, along with the optical diaphragm value which determine a maximum density resolution.

2. A device according to claim 1, in which said exposure control means determines the tube voltage and the tube current and the optical diaphragm value in accordance with the output pick-up signal from said image pick-up means at the time of fluoroscopic examination.

3. A device according to claim 1, in which said exposure control means sequentially calculates the optical diaphragm value in accordance with a saturation level of the output pick-up signal generated from said image pick-up means and density resolutions at respective tube voltages, and detects the maximum density resolution among the density resolutions at the respective tube voltages.

4. A device according to claim 1, in which the density resolution is defined by a signal-to-noise ratio of a level difference of the image pick-up signals respectively obtained from the region of interest and a region of noninterest of the object.

5. A device according to claim 4, in which the density resolution is defined by the number of photons of the X-ray radiated from said X-ray source and by the saturation level of the output signal from said image pick-up means.

* * * * *